United States Patent
Krishnamani et al.

(10) Patent No.: US 12,401,609 B2
(45) Date of Patent: Aug. 26, 2025

(54) SEGMENTATION AND ENGAGEMENT BASED MESSAGING

(71) Applicant: Capital One Services, LLC, McLean, VA (US)

(72) Inventors: Sangame Krishnamani, Plano, TX (US); Tyler Herron, Dallas, TX (US); Ryan Hennigan, Aubrey, TX (US); Tanner Thornton, Dallas, TX (US); Shiju Madathil Samuel, Frisco, TX (US); Nityan Bhorde, Dallas, TX (US); Hao Liu, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 35 days.

(21) Appl. No.: 18/491,931

(22) Filed: Oct. 23, 2023

(65) Prior Publication Data

US 2025/0133046 A1   Apr. 24, 2025

(51) Int. Cl.
*H04L 67/50* (2022.01)
*G06F 9/54* (2006.01)
*G06F 16/23* (2019.01)
*G06Q 20/38* (2012.01)
*G06Q 20/40* (2012.01)
*G06Q 30/02* (2023.01)
*H04L 51/21* (2022.01)

(52) U.S. Cl.
CPC .................. *H04L 51/21* (2022.05)

(58) Field of Classification Search
CPC ............................. H04L 51/21; H04L 67/535
USPC ............................................ 709/206
See application file for complete search history.

(56) References Cited

U.S. PATENT DOCUMENTS

| | | | |
|---|---|---|---|
| 2006/0212393 A1* | 9/2006 | Lindsay Brown ..... | G06Q 20/10 705/40 |
| 2019/0057400 A1* | 2/2019 | Nair ....................... | G06Q 20/20 |
| 2020/0097477 A1* | 3/2020 | Ryan ...................... | G06Q 30/01 |
| 2022/0231983 A1* | 7/2022 | Schumacher ........... | H04L 51/52 |
| 2023/0004999 A1* | 1/2023 | Sahasi ................. | G06F 16/9537 |
| 2023/0051225 A1* | 2/2023 | Nair ....................... | G06F 18/285 |
| 2023/0177469 A1* | 6/2023 | Awasthi ............... | G06Q 10/107 705/346 |
| 2023/0196435 A1* | 6/2023 | Chaturvedi .............. | G06N 3/08 705/26.7 |

(Continued)

FOREIGN PATENT DOCUMENTS

WO    WO-2023091519 A1 *   5/2023   ............. G06Q 10/04

*Primary Examiner* — Umar Cheema
*Assistant Examiner* — Golam Mahmud
(74) *Attorney, Agent, or Firm* — Harrity & Harrity, LLP

(57) ABSTRACT

In some implementations, a device may categorize a set of accounts into a set of messaging segments, wherein each account, of the set of accounts, is associated with one or more messaging segments of the set of messaging segments, and wherein the set of messaging segments are applicable to multiple communication channels. The device may determine, for each messaging segment associated with the account, an account configuration that is based on a content configuration associated with that messaging segment and based on an engagement persona associated with the account. The device may transmit, via one or more communication channels included in the multiple communication channels, one or more communications for the account in accordance with the account configuration.

20 Claims, 7 Drawing Sheets

(56) References Cited

U.S. PATENT DOCUMENTS

2023/0306445 A1* 9/2023 Kaitha ............... G06Q 30/0204
2024/0037086 A1* 2/2024 Lisagor ............... G06F 16/2358

* cited by examiner

SEGMENTATION AND ENGAGEMENT BASED MESSAGING

BACKGROUND

Managing multiple communication channels presents one or more technical challenges. For example, a system associated with managing multiple communication channels may need to ensure message consistency and branding across channels, perform resource allocation for diverse usage patterns, integrate data from disparate sources, ensure compliance with stringent privacy regulations, and/or meet rapid response time expectations, among other examples. In some examples, the system may transmit messages via one or more ineffective communication channels, resulting in increased operational costs, strained infrastructure, and/or wasted resources (e.g., processing resources, network resources, and/or power resources).

SUMMARY

Some implementations described herein relate to a system for segmentation and engagement based messaging. The system may include one or more memories and one or more processors communicatively coupled to the one or more memories. The one or more processors may be configured to segment a set of accounts into a set of messaging segments, wherein the set of messaging segments are associated with respective content configurations, wherein each account, of the set of accounts, is associated with one or more messaging segments of the set of messaging segments, and wherein the set of messaging segments are applicable to multiple communication channels. The one or more processors may be configured to determine, for an account included in the set of accounts and for each messaging segment associated with the account, an account configuration that is based on a content configuration associated with that messaging segment and based on an engagement persona associated with the account, wherein the engagement persona indicates relative engagement performance levels for respective communication channels of the multiple communication channels. The one or more processors may be configured to transmit, for each messaging segment associated with the account and via one or more communication channels included in the multiple communication channels, one or more communications for the account in accordance with the account configuration.

Some implementations described herein relate to a method for segmentation and engagement based messaging. The method may include categorizing, by a device, a set of accounts into a set of messaging segments, wherein each account, of the set of accounts, is associated with one or more messaging segments of the set of messaging segments, and wherein the set of messaging segments are applicable to multiple communication channels. The method may include determining, by the device for an account included in the set of accounts and for each messaging segment associated with the account, an account configuration that is based on a content configuration associated with that messaging segment and based on an engagement persona associated with the account. The method may include transmitting, by the device for at least one messaging segment associated with the account and via one or more communication channels included in the multiple communication channels, one or more communications for the account in accordance with the account configuration.

Some implementations described herein relate to a non-transitory computer-readable medium that stores a set of instructions. The set of instructions, when executed by one or more processors of a device, may cause the device to segment a set of accounts into a set of messaging segments, wherein the set of messaging segments are associated with respective content configurations, wherein each account, of the set of accounts, is associated with one or more messaging segments of the set of messaging segments, and wherein the set of messaging segments are applicable to multiple communication channels. The set of instructions, when executed by one or more processors of the device, may cause the device to determine, for an account included in the set of accounts and for each messaging segment associated with the account, an account configuration that is based on a content configuration associated with that messaging segment and based on an engagement persona associated with the account, wherein the engagement persona indicates relative engagement performance levels for respective communication channels of the multiple communication channels. The set of instructions, when executed by one or more processors of the device, may cause the device to transmit, for each messaging segment associated with the account and via one or more communication channels included in the multiple communication channels, one or more communications for the account in accordance with the account configuration.

DETAILED DESCRIPTION

Figure 1A:
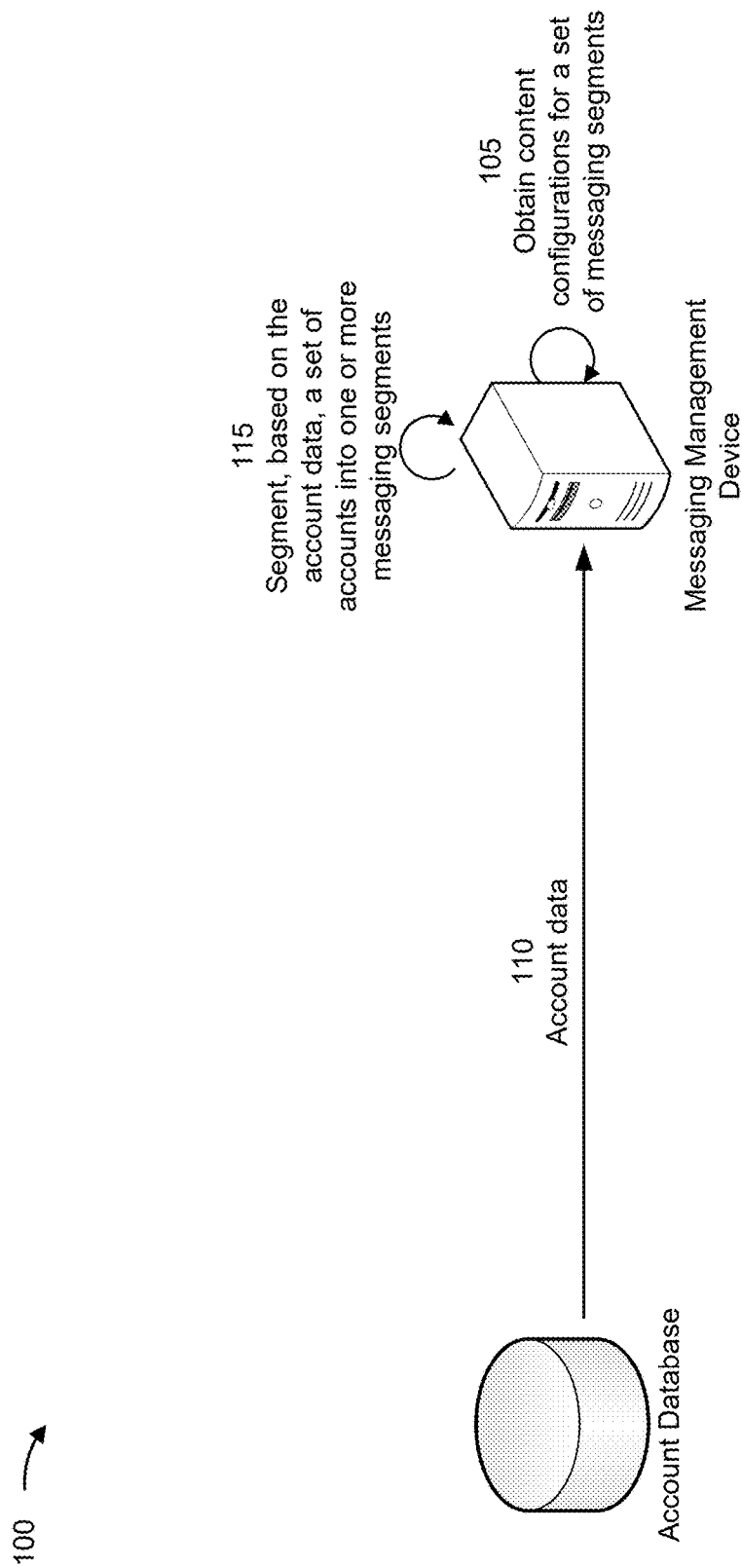
FIGS. 1A-1D are diagrams of an example associated with segmentation and engagement based messaging, in accordance with some embodiments of the present disclosure.

The following detailed description of example implementations refers to the accompanying drawings. The same reference numbers in different drawings may identify the same or similar elements.

In some examples, a system may utilize multiple communication channels for transmitting messages. For example, the multiple communication channels may include a phone (or audio) channel, an email channel, a short messaging service (SMS) (or text message) channel, an application channel (e.g., a push notification or pop-up message channel), a physical mail channel, and/or another type of communication channel. In some examples, the system may utilize separate or distinct pipelines, systems, system flows, and/or protocols for each communication channel. For example, the system may manage communication channels separately because of the different channel-specific features, different technical requirements, different regulatory and/or compliance rules, redundancy and reliability concerns (e.g., managing communication channels separately may allow for greater control over redundancy strategies for critical communication channels), and/or enhanced performance optimization (e.g., by managing communication channels separately, the system can optimize performance for each communication channel individually), among other examples.

However, managing communication channels separately may result in increased resource overhead and/or inefficiencies, among other examples. While managing different communication channels separately can offer advantages in terms of channel-specific optimization and customization, the separate management may result in one or more challenges. For example, managing separate pipelines for various channels can be resource-intensive, using dedicated teams and infrastructure for communication channels, thereby increasing operational costs, consuming resources, and/or increasing complexity, among other examples. Further, when a change is made that is to be applied to multiple communication channels, the same change may need to be made across multiple pipelines, system flows, and/or protocols, thereby consuming processing resources, computing resources, and/or power resources associated with repetitively performing the same, or similar, operations to implement the change for each communication channel. Additionally, managing communication channels separately may result an inconsistent user experience. For example, implementing changes or updates across different pipelines (e.g., for different communication channels) individually can lead to disparities in functionality and user experience. Users may encounter inconsistent features, response times, and/or message formatting, among other examples, leading to an inconsistent user experience. Further, expanding the system to accommodate new communication channels may become cumbersome, because each communication channel may require unique integration and maintenance efforts, such as building pipelines, and/or establishing protocols, among other examples. This can degrade the scalability of the system. As another example, synchronizing data across separately managed communication channels can result in data fragmentation and data silos. Maintaining a unified view of user interactions, preferences, and/or histories may be challenging, limiting the ability of the system to provide personalized services.

Further, different users may interact with communication channels differently. For example, different users may engage more with different communication channels. For example, some users may prefer to communicate via phone, while other users may prefer to communicate via email. However, in some examples, to address concerns or challenges associated with the separate management of communication channels, the system may employ an omnichannel approach that ensures seamless integration and consistent messaging across all communication channels. However, using an omnichannel approach for communications across multiple communication channels for all users may result in some communications being transmitted over communication channels with a low likelihood of engagement for certain users. This may consume processing resources, network resources, memory resources, and/or power resources, among other examples, associated with generating and transmitting the communications over communication channels with a low likelihood of engagement. Additionally, in some cases, regulatory rules or compliance rules may limit a quantity or rate of communications to given users. Therefore, transmitting the communications over communication channels with a low likelihood of engagement may result in a limit of communications being met where the communications transmitted have a low likelihood of engagement, thereby decreasing the effectiveness or efficiency of the communications and/or increasing a likelihood that the system will be unable to contact certain users (e.g., because of the limit of communications being met using communication channels with a low likelihood of engagement).

Some implementations described herein enable channel-agnostic segmentation and engagement based messaging. For example, a messaging management device may segment a set of accounts into a set of messaging segments. The messaging segments may be communication channel agnostic (e.g., may be applicably for digital and non-digital communication channels, such as for text channels and phone channels). For example, the set of messaging segments may define configuration information that is applicable to all communication channels. In some implementations, the set of messaging segments are associated with respective content configurations that are applicable to all communication channels. Additionally, the messaging management device may determine, for an account included in the set of accounts and for each messaging segment associated with the account, an account configuration that is based on a content configuration associated with that messaging segment and based on an engagement persona associated with the account. For example, the account configuration may modify, for a given messaging segment, a content configuration based on the engagement persona associated with the account.

For example, the messaging management device may determine, for a given account, one or more messaging segments to be associated with the account based on account data associated with the account. For example, the messaging management device may determine, for the given account, a type or category of communication to be associated with the account. In other words, the messaging segments may group different accounts together for common content configurations based on account data associated with respective accounts.

The messaging management device may determine, for a given account, an account configuration based on the engagement persona associated with the account. The engagement persona may indicate relative engagement performance levels for respective communication channels of the multiple communication channels for the given account. For example, the account configuration may define communication channel specific configurations in context of the content configuration defined by a messaging segment. The communication channel specific configurations may be based on the relative engagement performance levels for respective communication channels of the multiple communication channels for the given account. The messaging management device may transmit, for each messaging segment associated with the account and via one or more communication channels included in the multiple communication channels, one or more communications for the account in accordance with the account configuration.

As a result, the messaging segments may enable communication channel agnostic control and configuration for content configurations for one or more accounts. For example, this may enable the messaging management device to make a modification to a messaging segment that is applicable to multiple communication channels. As a result, the messaging management device may conserve processing resources, computing resources, and/or power resources associated with repetitively performing the same, or similar, operations to implement the change for each communication channel. Further, by segmenting accounts into one or more messaging segments, changes or updates across different pipelines (e.g., for different communication channels) can be implemented consistently, reducing a likelihood of disparities in functionality and user experience for messaging. Additionally, by segmenting accounts into one or more messaging segments, a new communication channel may be easily integrated into a messaging platform because the new communication channel may be integrated into the content configuration defined by one or more messaging segments without unique integration and maintenance efforts, such as building pipelines, and/or establishing protocols, among other examples, thereby improving the scalability of the messaging platform.

By defining an account configuration for each account (for example, that is based on the messaging segment(s) associated with that account and the engagement persona associated with that account), a likelihood of messaging over communication channels with a higher likelihood of success or engagement for that account may be improved. For example, by determining an account configuration for an account, the messaging management device may be enabled to transmit one or more communications for the account in accordance with a content configuration defined by a messaging segment via one or more communication channels that have a higher likelihood of engagement for the account. This may conserve processing resources, network resources, memory resources, and/or power resources that would have otherwise been used to transmit communications for the account via one or more communication channels that have a lower likelihood of engagement for the account (e.g., if a baseline configuration defined by the messaging segment were to be used for the account). Additionally, this may reduce a likelihood that communication limits (e.g., defined by a compliance or regulatory rule) are met because of communications that are transmitted via one or more communication channels that have a lower likelihood of engagement for the account.

FIGS. 1A-1D are diagrams of an example 100 associated with segmentation and engagement based messaging. As shown in FIGS. 1A-1D, example 100 includes a messaging management device, an account database, an engagement database, and/or one or more client devices. These devices are described in more detail in connection with FIGS. 2 and 3.

As shown in FIG. 1A, and by reference number 105, the messaging management device may obtain content configurations for a set of messaging segments. For example, the messaging management device may obtain content configurations for respective messaging segments of the set of messaging segments. A messaging segment may define a messaging context or messaging ownership for a subset of accounts across multiple (or all available) communication channels. For example, a messaging segment may be a segment of accounts (or a subset of accounts) from a set of accounts that are associated with an entity. The messaging segment may include a segment of accounts that are associated with a similar (or the same) communication strategy or content configuration. A messaging segment may be channel agnostic. In other words, the communication strategy or content configuration may be applicable to multiple (or all available) communication channels.

Each messaging segment may be associated with a content configuration. The content configuration may define how and/or when communications are to be transmitted and a content (or content strategy) of the communications. For example, a content configuration may define an intensity of communications to be transmitted. An "intensity" of communications may refer to the rate and/or volume transmission of the communications. A content configuration may define a frequency of transmission of the communications.

In some implementations, a content configuration may define content for the communications. For example, the content configuration may define a content category or a content type associated with the communications. Additionally, or alternatively, the content configuration may define a format of the communications (e.g., a template or design of the communications). Additionally, or alternatively, the content configuration may define a timing associated with the communications (e.g., a time of day at which the communications are to be transmitted and/or one or more days of the week on which the communications are to be transmitted).

A content configuration may define routing information for the communications. The routing information may define one or more communication channels over which the communications are to be transmitted. For example, the content configuration may indicate a ranking of communication channels. The ranking may indicate a priority of respective communication channels for the communications. For example, the content configuration may indicate that a communication should transmitted via a higher ranked or higher priority communication channel, if possible.

The messaging management device may obtain the content configurations via a database. For example, a user may define content configurations for respective messaging segments. The content configurations may be stored in the database. The messaging management device may retrieve the content configurations from the database.

In some implementations, the messaging management device may obtain an update to one or more content configurations associated with the set of messaging segments. For example, a user input may modify a parameter of a content configuration, add a new parameter to the content configuration, and/or otherwise modify the content configuration. The messaging management device may apply, for each communication channel associated with the set of messaging segments, the update to the one or more content configurations. For example, by updating the messaging segment (e.g., the content configuration associated with the messaging segment), the messaging management device may be enabled to apply the update to multiple communication channels without separately updating protocols, configurations, and/or other information separately for each of the multiple communication channels. This may reduce the complexity of updating content configurations, may ensure that content configurations are uniformly applied across communication channels, and/or may conserve resources (e.g., processing resources, network resources, and/or power resources) that would have otherwise been used to separately update protocols, configurations, and/or other information separately for each of the multiple communication channels.

As shown by reference number 110, the messaging management device may obtain, via the account database, account data. The account data may include data associated with respective accounts of a set of accounts. For example, each account may be associated with account data. The account database may include one or more databases for an entity (e.g., an entity that provides and/or manages the set of accounts). For example, the account database may be a centralized database in which account data for accounts associated with the entity is stored.

The account data may include an account identifier, payment history, one or more account preferences, an account type, an account balance, transaction data, beneficiary information, a credit score, a credit limit, an interest rate, one or more payment due dates, and/or investment portfolio holdings, among other examples. In some implementations, the account data may include one or machine learning model outputs. For example, the messaging management device may obtain, from a machine learning model, one or more scores or indications associated with respective accounts.

As an example, the messaging management device may be associated with a machine learning model that is configured to determine a risk score (e.g., indicating a level of risk or a likelihood of a negative outcome, such as a default or lack of payment, associated with an account or a loan). In such examples, the account data may include the risk score. As another example, the messaging management device may be associated with a machine learning model that is configured to determine or predict a content category (e.g., indicating a predicted content category or content type that an account is most likely to engage with). In such examples, the account data may include the content category.

As shown by reference number 115, the messaging management device may segment, based on the account data, the set of accounts into one or more messaging segments. For example, the messaging management device may segment the set of accounts into a set of (e.g., one or more) messaging segments. For example, the messaging management device may categorize the set of accounts into the set of messaging segments. Each account, of the set of accounts, may be associated with one or more messaging segments of the set of messaging segments.

For example, the messaging management device may obtain historical account data (e.g., the account data obtained as described in connection with reference number 105) associated with respective accounts of the set of accounts. The historical account data may be associated with the respective accounts in that the historical account data may be generated based on actions or information associated with the respective accounts. The messaging management device may determine, for each account and based on the historical account data, one or more content configurations to be associated with that account. For example, based on the account data for the given account (e.g., historical account data for the account), the messaging management device may determine one or more content configurations that are applicable to the account. For example, the account data may define a profile for the account. The profile may be associated with one or more content configurations and/or one or more messaging segments. For example, the profile may be mapped or correlated to the one or more content configurations and/or the one or more messaging segments. The messaging management device may determine, for each account and based on the one or more content configurations, the one or more messaging segments to be associated with that account.

For example, the messaging management device may determine, for a given account, one or more messaging segments to be associated with the given account. The one or more messaging segments may define segments (e.g., groups or subsets) in which the given account is included. The messaging segments may define separate operations or configurations (e.g., in the context of messaging) for the given account relative to other accounts associated with the entity. As described elsewhere herein, the messaging segments may define separate operations or configurations for multiple communication channels (e.g., for digital and/or non-digital channels).

Figure 1B:
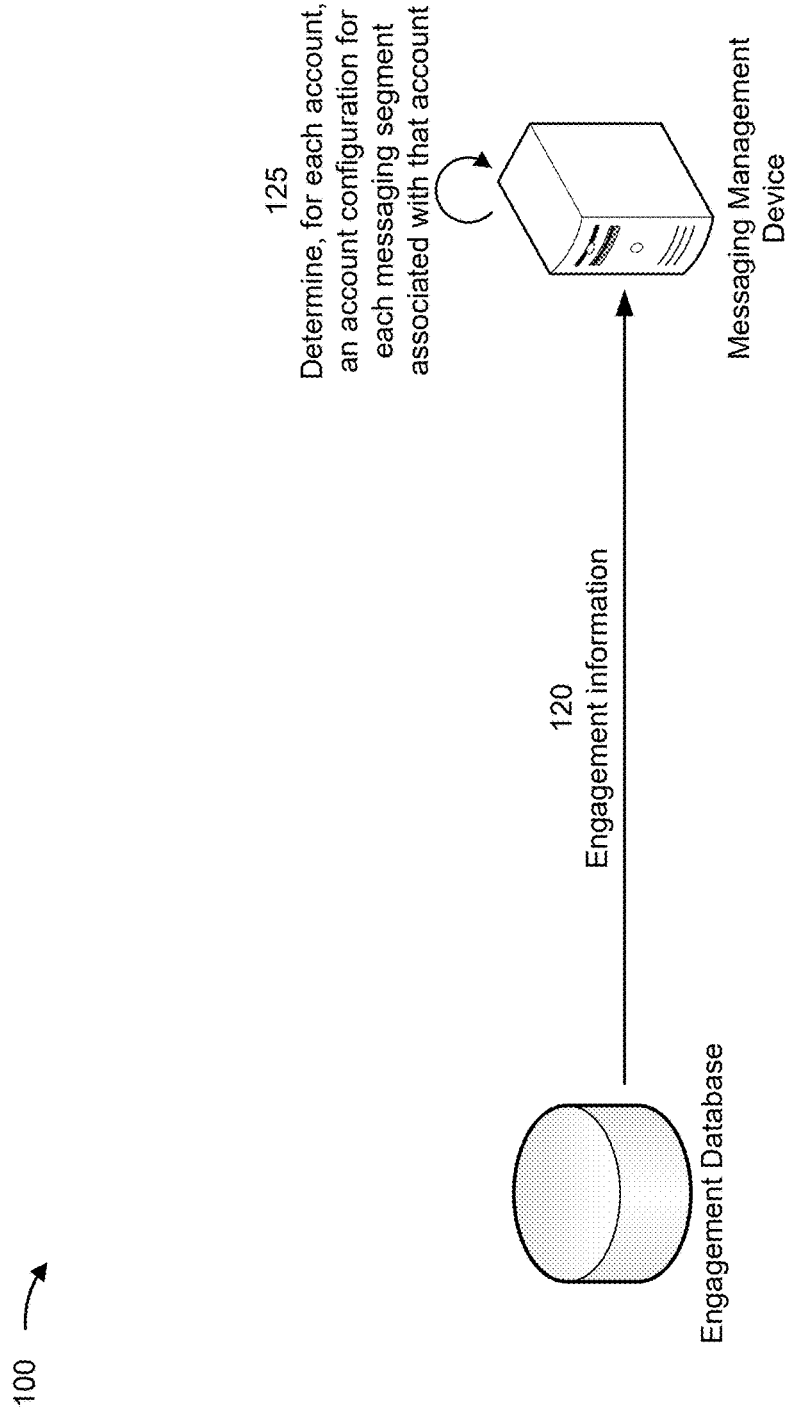

As shown in FIG. 1B, and by reference number 120, the messaging management device may obtain historical engagement information associated with one or more accounts. The historical engagement information may indicate engagement information, for a given account, with historical communications. As used herein, "engagement" may refer to a level of active and meaningful interaction, participation, or response that a user exhibits when interacting with content, messages, or experiences delivered through various communication channels. For example, engagement information may be indicated via a user (e.g., as indicated via a client device via which the user interacts with a communication) reading, responding, sharing, liking, clicking, and/or taking desired actions, among other examples. In some implementations, the engagement information may indicate one or more live events (e.g., real-time events) associated with a given account. For example, the live events may be streamed to the messaging management device as they occur to enable the messaging management device to tailor an account configuration in real time.

High user engagement may indicate that the communication has successfully captured the user's attention, resonated with needs or interests, and/or motivated the user to engage actively, thereby improving a communication experience. For example, if a user engages with (e.g., reads, opens, responds to, or otherwise interacts with) a first communication via a first communication channel, but does not interact with a second communication via a second communication channel (e.g., and the first communication and the second communication convey similar content), then this may indicate that the user prefers to communicate via the first communication channel.

For example, the messaging management device may utilize a machine learning model to obtain an engagement score for respective communication channels associated with a given account. The machine learning model may be trained to determine engagement scores (e.g., indicating a likelihood of engagement or success) for communication channels based on engagement information associated with a given account. For example, the messaging management device may provide, as an input to the machine learning model, the engagement information for a given account. The messaging management device may obtain, via one or more outputs of the machine learning model, an indication of engagement scores for respective communication channels.

In some implementations, the messaging management device may determine an engagement persona for respective accounts of the set of accounts. An engagement persona may indicate relative engagement performance levels for respective communication channels of the multiple communication channels. An engagement performance level may be, or may be indicated by, an engagement score and/or engagement information associated with a given communication channel and a given account. The relative engagement performance levels for the respective communication channels may indicate likelihoods of engagement for communications transmitted via the respective communication channels for the account. The relative engagement performance levels may be relative to other accounts, of the set of accounts, included in that messaging segment and/or an account category. For example, an account category may include accounts associated with a particular line of business of an entity.

For example, an engagement persona may be representative of engagement profiles a group rather than a specific person with a user profile. For example, the messaging management device may normalize engagement information associated with different accounts. The messaging management device may identify associations between characteristics of different accounts. For example, the messaging management device may create vector representations of the engagement information to identify common accounts and associate the common engagement characteristics with an engagement persona that generalizes the common engagement characteristics shared by the accounts. In some implementations, the messaging management device may use machine learning or analytics operations to identify the common accounts and/or determine the engagement persona for a given account, such as using a K-means approach, a K-nearest-neighbor approach, or a similar approach.

In some implementations, an engagement persona may be specific to a given messaging segment. For example, the relative engagement performance levels for the respective communication channels may indicate likelihoods of engagement for communications transmitted via the respective communication channels for the account relative to other accounts included in a given messaging segment.

In some implementations, the messaging management device may rank or order engagement levels of respective accounts from a set of accounts for each communication channel. The rank or order may be from the highest level of engagement to a lowest level of engagement. The set of accounts may be accounts associated with a given messaging segment, a given line of business, or another set of accounts. For example, the messaging management device may rank engagement scores for respective accounts for a given communication channel. The messaging management device may categorize the set of accounts into one or more categories based on the rank order. For example, accounts associated with a top W % of the rank order may be associated with a first category (e.g., high engagement) for the communication channel, accounts associated with a rank order from E % to W % may be associated with a second category (e.g., medium engagement) for the communication channel, and/or accounts associated with a bottom E % of the rank order may be associated with a third category (e.g., low engagement) for the communication channel. The messaging management device may similarly categorize the set of accounts for multiple communication channels (e.g., for all available communication channels of a given messaging segment).

An engagement persona for a given account may include categories for respective communication channels (e.g., where the categories are determined in a similar manner as described above). For example, an engagement persona for a first account may include high engagement for a first communication channel, low engagement for a second communication channel, and medium engagement for a third communication channel. An engagement persona for a second account may include low engagement for the first communication channel, medium engagement for the second communication channel, and high engagement for the third communication channel. This may enable the messaging management device to modify communication strategies within a given messaging segment to be tailored to engagement trends for particular accounts included in the given messaging segment, thereby increasing a likelihood of success for communications associated with the given messaging segment.

For example, the messaging management device may determine, based on the historical engagement information associated with one or more accounts, that are associated with that messaging segment, relative engagement performance levels. The relative engagement performance levels may indicate engagement levels of the account for respective communication channels relative to engagement levels of respective accounts of the one or more accounts that are associated with a given messaging segment. The messaging management device may determine, for the account, a prioritized ranking of the respective communication channels based on the relative engagement performance levels. The prioritized ranking may indicate categories of the respective communication channels. The engagement persona for the account may include the categories. The messaging management device may determine engagement personas for each account in a similar manner as described herein.

For example, as shown by reference number 125, the messaging management device may determine, for each account, an account configuration for each messaging segment associated with that account. The account configuration may be specific to an account and a messaging segment. For example, a messaging segment may define a content configuration (e.g., a default configuration), as described elsewhere herein. The messaging management device may, to generate the account configuration, modify one or more parameters of the content configuration based on the engagement persona associated with the account. For example, for a communication channel associated with the messaging segment, the messaging management device may modify one or more parameters of the content configuration for that communication channel based on a category (e.g., indicated by the engagement persona) of the account for that communication channel.

For example, as described elsewhere herein, the messaging management device may determine, based on the engagement information (e.g., based on historical engagement information for the account), the relative engagement levels for respective communication channels. The messaging management device may determine a prioritized ranking of the respective communication channels based on the relative engagement levels. The messaging management device may modify, for one or more communication channels, a content configuration indicated by a messaging segment for an account in accordance with the prioritized ranking (e.g., in accordance with an engagement level category indicated by the prioritized ranking).

The messaging management device may modify, for at least one communication channel included in the multiple communication channels associated with a given messaging segment, the content configuration for that messaging segment for the at least one communication channel to obtain the account configuration in accordance with the prioritized ranking described elsewhere herein. The ranking may indicate a prioritization of one or more communication channels associated with a given messaging segment for an account. For example, based on ranking accounts according to engagement levels for different communication channels, the messaging management device may be enabled to generate account configurations (e.g., based on the default content configuration for that messaging segment) that are personalized to a given account.

In some implementations, the messaging management device may determine and/or update the account configuration based on live events (e.g., real-time events) associated with the account. For example, a user may perform one or more actions associated with the account, such as visiting a page (e.g., a web page or an application page), making a payment, and/or reading or opening a communication, among other examples. The live event may be associated with an action or may be the detection that an expected action has not occurred. The messaging management device may determine and/or update the account configuration based on the event associated with the account. For example, the messaging management device may obtain an indication of live events via one or more data streams. The messaging management device may update the account configuration in real time based on actions taken by a user associated with the account. For example, if the live event indicates that a user has visited a page associated with making a payment, but that a payment for the account has not been processed, the messaging management device may update the account configuration to cause a communication to be transmitted indicating information associated with making the payment. The real-time events may enable the messaging management device to transform new, arbitrary, and/or unconfigured account information into an engagement persona-driven communication campaigns with appropriately updated communication strategies.

For example, for a messaging segment 1, the content configuration may indicate a periodicity (e.g., frequency of communications) of X for a communication channel 1, a periodicity of A for a communication channel 2, and a periodicity of B for a communication channel 3. The messaging management device may modify the periodicity for the communication channel 1 and the communication channel 3 for the account (e.g., to determine the account configuration). For example, the messaging management device may increase or decrease the frequency of communications for a given communication channel based on a category for the given communication channel indicated by the engagement persona of the account. For example, if the engagement persona indicates a higher level of engagement for a given communication channel, then the messaging management device may increase the frequency of communications for the given communication channel (e.g., and reduce the frequency of communications for one or more other communication channels). As another example, if the engagement persona indicates a lower level of engagement for a given communication channel, then the messaging management device may decrease the frequency of communications for the given communication channel (e.g., and increase the frequency of communications for one or more other communication channels). In other words, the messaging management device may modify a communication frequency, for at least one communication channel, indicated by the content configuration based on an engagement level indicated by the engagement persona.

The messaging management device may modify other parameters for the content configuration for one or more communication channels in a similar manner (e.g., based on information indicated by the engagement persona). For example, the messaging management device may modify a communication content, for the at least one communication channel, indicated by the content configuration based on an engagement level indicated by a category (e.g., the category being indicated by the engagement persona). For example, the messaging management device may modify a template or format of communications associated with a given communication channel based on the category (e.g., the category being indicated by the engagement persona). As another example, the messaging management device may modify a timing associated with the communications for one or more communication channels (e.g., may modify a time of day and/or a day of the week associated with transmission of communications).

In some implementations, the messaging management device may determine a ranking of communication channels for the messaging segment for a given account (e.g., to be indicated via the account configuration). For example, the ranking of communication channels may indicate fallback communication channels in the event that a communication via a first communication channel fails. For example, by ranking the communication channels based on the engagement persona of the account (e.g., from higher levels of engagement to lower levels of engagement for that account), a likelihood that a follow-up communication via a different communication channel is successful may be improved.

Figure 1C:
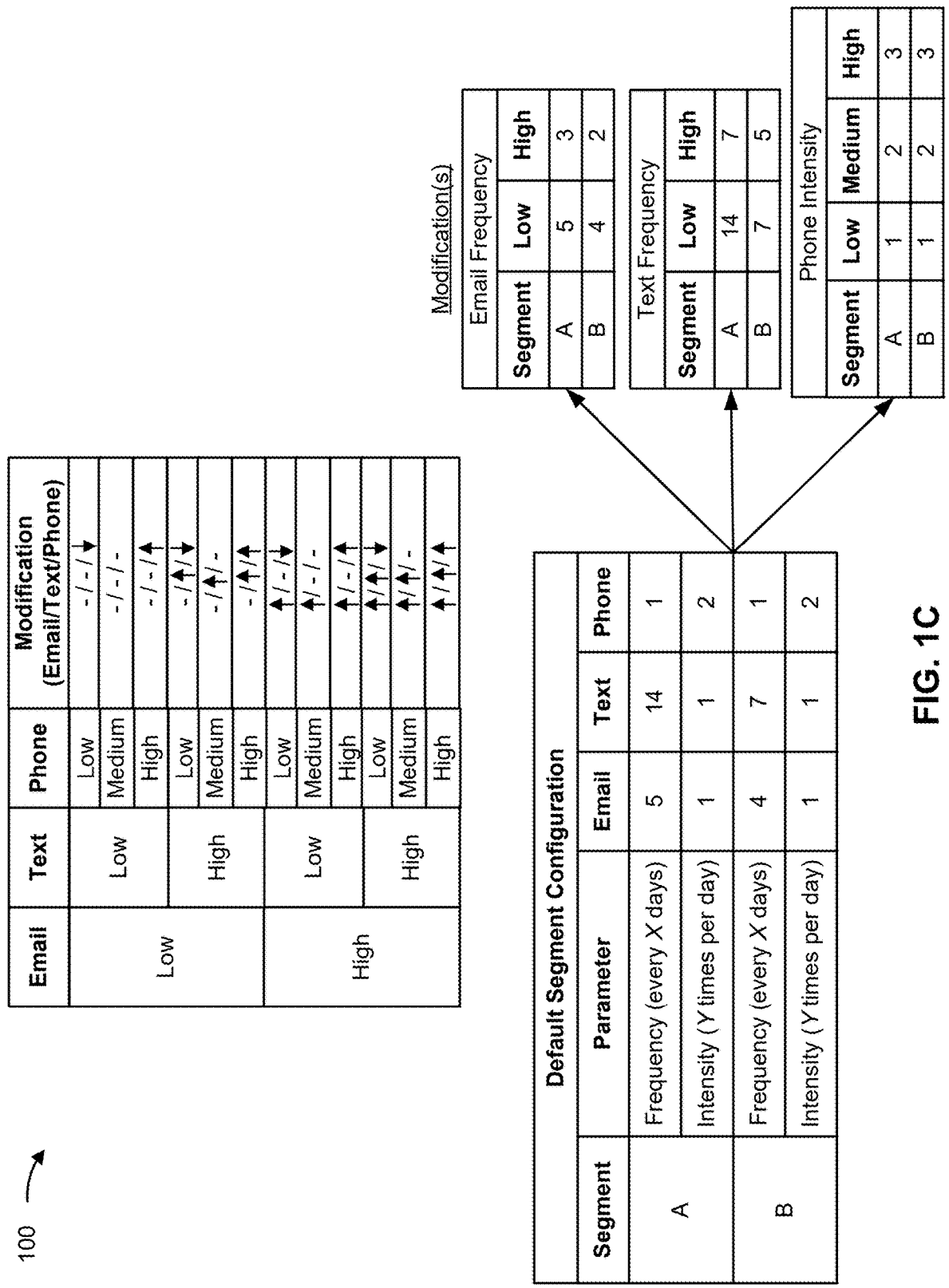

For example, as shown in FIG. 1C, different communication channels may be associated with different categorizations for engagement personas. For example, an email channel may be associated with a low engagement category and a high engagement category. Similarly, a text channel may be associated with a low engagement category and a high engagement category. A phone channel may be associated with a low engagement category, a medium engagement category, and a high engagement category. A given engagement persona may be categorized into categories for respective communication channels. Depending on the category of a given communication channel, the engagement persona may indicate whether a frequency and/or intensity of communications for the given channel should be cause messages to be transmitted more often (e.g., shown by arrows pointing up in FIG. 1C), less often (e.g., shown by arrows pointing down in FIG. 1C), or remain the same (e.g., shown a "-" in FIG. 1C) relative to a default configuration for a messaging segment. For example, as shown in FIG. 1C, for the low engagement category of the email channel, the account configuration may be unmodified relative to a default configuration for a messaging segment. For the high engagement category of the email channel, the account configuration may indicate an increased frequency and/or intensity relative to a default configuration for a messaging segment.

For example, the messaging management device, for an account configuration, may increase, decrease, or not modify a frequency, an intensity, and/or another parameter (such as a content) of a communication channel based on the category for the communication channel as indicated by the engagement persona. As an example, as shown in FIG. 1C, for an engagement persona indicating high engagement for the email channel, the messaging management device may determine that the account configuration is to be associated with a frequency of one communication every 3 days for a messaging segment A (e.g., rather than on communication every 5 days as indicated by the default segment configuration).

In some implementations, an account may be associated with a messaging segment group. The messaging segment group may include one or more messaging segments. The messaging management device may perform one or more operations for the account based on the messaging segment group. The messaging segment group may define operations for the account outside of outbound communications (e.g., based on the messaging segment(s) that the account has been grouped into). For example, the messaging management device may perform inbound call routing based on the messaging segment group associated with an account. The messaging management device may determine that an inbound phone call is associated with an account (e.g., based on a phone number of the caller being associated with the account). The messaging management device may determine a destination for the call based on the messaging segment group. For example, the messaging management device may route the inbound call to a destination that is associated with (e.g., that is mapped to) the messaging segment group.

Figure 1D:
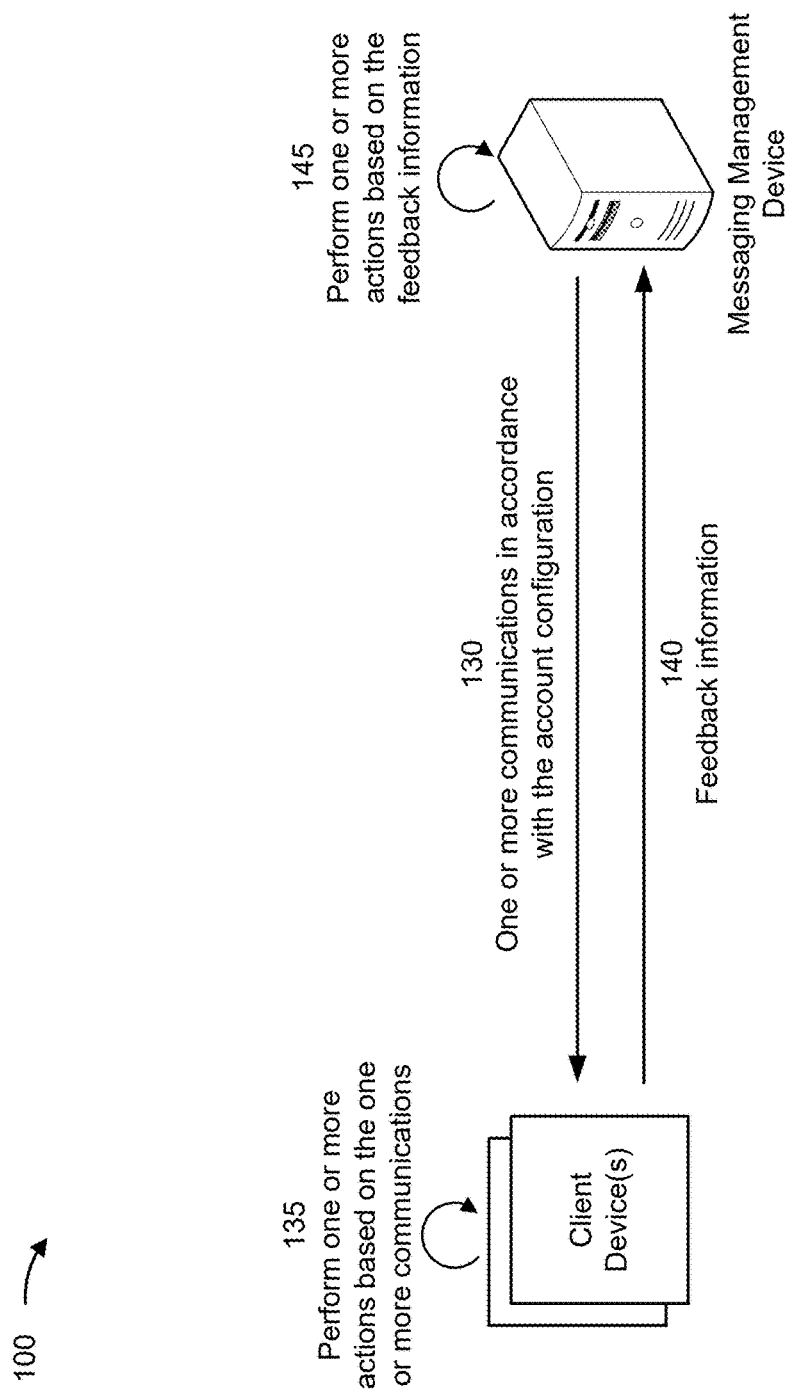

As shown in FIG. 1D, and by reference number 130, the messaging management device may transmit one or more communications, for an account, in accordance with the account configuration associated with the account (e.g., for a given messaging segment). The messaging management device may transmit one or more communications in accordance with other account configurations associated with respective accounts. The messaging management device may transmit the one or more communications to one or more client devices (e.g., via one or more communication channels). For example, the messaging management device may transmit one or more communications following one or more configuration parameters (e.g., a periodicity, rate, frequency, timing, and/or content) defined by the account configuration associated with the account.

The messaging management device may transmit, for each messaging segment associated with the account and via one or more communication channels included in the multiple communication channels, one or more communications for the account in accordance with the account configurations for respective messaging segments associated with the account. For example, for a given account, the messaging management device may identify which communications are to be transmitted for the given account based on the messaging segment(s) associated with the given account and account configuration for respective messaging segments. The messaging management device may transmit communications for other accounts in a similar manner.

As shown by reference number 135, one or more client devices may perform one or more actions based on the communications. For example, the one or more client devices may perform one or more engagement operations. An engagement operation may include opening a communication, detecting a user interaction with an element of a communication, navigating to a page indicated by (or included in) a communication (e.g., based on a user interaction with a link included in the communication), opening a page or application associated with the entity associated with the communication, logging in to the account via the page or the application, and/or performing one or more operations via the page or the application, among other examples.

For example, a communication may indicate that an operation associated with the account is available or should be performed. As an example, the communication may indicate that there is an upcoming payment due for the account. The one or more actions may include navigating to a page (e.g., web page) or application via which the operation (e.g., indicated by the communication) can be performed. For example, the one or more actions may include navigating to a page or application via which the payment for the application can be submitted.

As shown by reference number 140, the messaging management device may obtain feedback information (e.g., via the one or more client devices or via another device, such as a server device). The feedback information may indicate engagement information associated with the one or more communications (e.g., transmitted as described in connection with reference number 130). For example, the feedback information may indicate the one or more actions performed by the one or more client devices (e.g., as described in connection with reference number 135). Additionally, or alternatively, the feedback information may indicate whether the one or more communications were successfully delivered and/or opened via the one or more client devices.

As shown by reference number 145, the messaging management device may perform one or more actions based on the feedback information. For example, the feedback information may indicate that the one or more communications were not successful via a first communication channel (e.g., were not delivered or were not opened via the client device (s)). In such examples, the messaging management device may determine, based on the account configuration for a messaging segment associated with the one or more communications, a second communication channel. For example, the account configuration may indicate a ranking or order of communication channels for the account (e.g., as described elsewhere herein). The messaging management device may determine (e.g., may select) the second communication channel based on the ranking or order indicating that the second communication channel has the highest likelihood of success for the account (e.g., excluding the first communication channel). The messaging management device may transmit, via the second communication channel, another one or more communications indicating the same or similar content as the first one or more communications. This may improve a likelihood that the content is successfully delivered to a user associated with the account. Additionally, this may conserve processing resources, network resources, and/or power resources that would have otherwise been used to transmit follow-up communications via communication channels that have a lower likelihood of success for the account. Further, this may ensure that, when the quantity of communications that can be transmitted to the account is limited (e.g., by a regulatory rule or compliance rule), that the limited quantity of communications are transmitted via communication channels that have a higher likelihood of success for the account.

Additionally, or alternatively, the feedback information may indicate engagement information associated with the one or more communications. The messaging management device may modify, based on the engagement information, the account configuration. For example, the engagement information may indicate whether engagement with the one or more communications was detected via the one or more client devices. For example, the engagement information may indicate the one or more actions performed via the one or more client devices. The messaging management device may modify the account configuration (e.g., for the messaging segment associated with the one or more communications) based on the level of engagement indicated by the engagement information. For example, if the engagement information indicates a low level of engagement for a given communication channel (e.g., indicating that the communication(s) were not opened, that no actions were performed in response to the communication(s), and/or other actions (or lack of actions) indicative of a low level of engagement), then the messaging management device may modify a category for the communication channel (e.g., for the engagement persona associated with the account) to indicate a lower likelihood of success for the communication channel. Alternatively, if the engagement information indicates a higher level of engagement for a given communication channel (e.g., indicating that the communication(s) were opened, that one or more actions were performed in response to the communication(s), and/or other actions indicative of a high level of engagement), then the messaging management device may modify a category for the communication channel (e.g., for the engagement persona associated with the account) to indicate a higher likelihood of success for the communication channel.

Additionally, or alternatively, the feedback information and/or the engagement information may indicate one or more user actions taken in response to the one or more communications. In such examples, the messaging management device may determine, based on the one or more user actions, follow-up content. For example, the follow-up content may include assistance information based on the one or more user actions. For example, the one or more user actions may indicate that a client device navigated to a page or application associated with performing an operation (e.g., an operation indicated by or requested by a communication), but that the operation was not performed. In such examples, the feedback information may indicate assistance information to aid or facilitate the operation being performed (e.g., the follow-up content may ask whether a user needs help performing the operations and/or may include a link to a help page associated with performing the operation). As another example, the one or more user actions may indicate that an operation was attempted and not successful. In such examples, the follow-up content may include a link to a help page associated with performing the operation, an indication of a phone number to a call center to speak with an agent to facilitate the operation being performed, and/or an interactive element configured to cause a client device to initiate a call to the call center, among other examples.

The messaging management device may determine, based on the account configuration, one or more communication channels over which to transmit the follow-up content (e.g., in a similar manner as described elsewhere herein). The messaging management device may transmit, via the one or more communication channels, another one or more communications indicating the follow-up content.

As described herein, the messaging segments may enable communication channel agnostic control and configuration for content configurations for one or more accounts. For example, this may enable the messaging management device to make a modification to a messaging segment that is applicable to multiple communication channels. As a result, the messaging management device may conserve processing resources, computing resources, and/or power resources associated with repetitively performing the same, or similar, operations to implement the change for each communication channel. By defining account configuration for each account (for example, that is based on the messaging segment(s) associated with that account and the engagement persona associated with that account), a likelihood of messaging over communication channels with a higher likelihood of engagement for that account may be improved. This may conserve processing resources, network resources, memory resources, and/or power resources that would have otherwise been used to transmit communications for the account via one or more communication channels that have a lower likelihood of success for the account (e.g., if a baseline configuration defined by the messaging segment were to be used for the account). Additionally, this may reduce a likelihood that communication limits (e.g., defined by a compliance or regulatory rule) are met because of communications that are transmitted via one or more communication channels that have a lower likelihood of success for the account.

As indicated above, FIGS. 1A-1D are provided as an example. Other examples may differ from what is described with regard to FIGS. 1A-1D.

Figure 2:
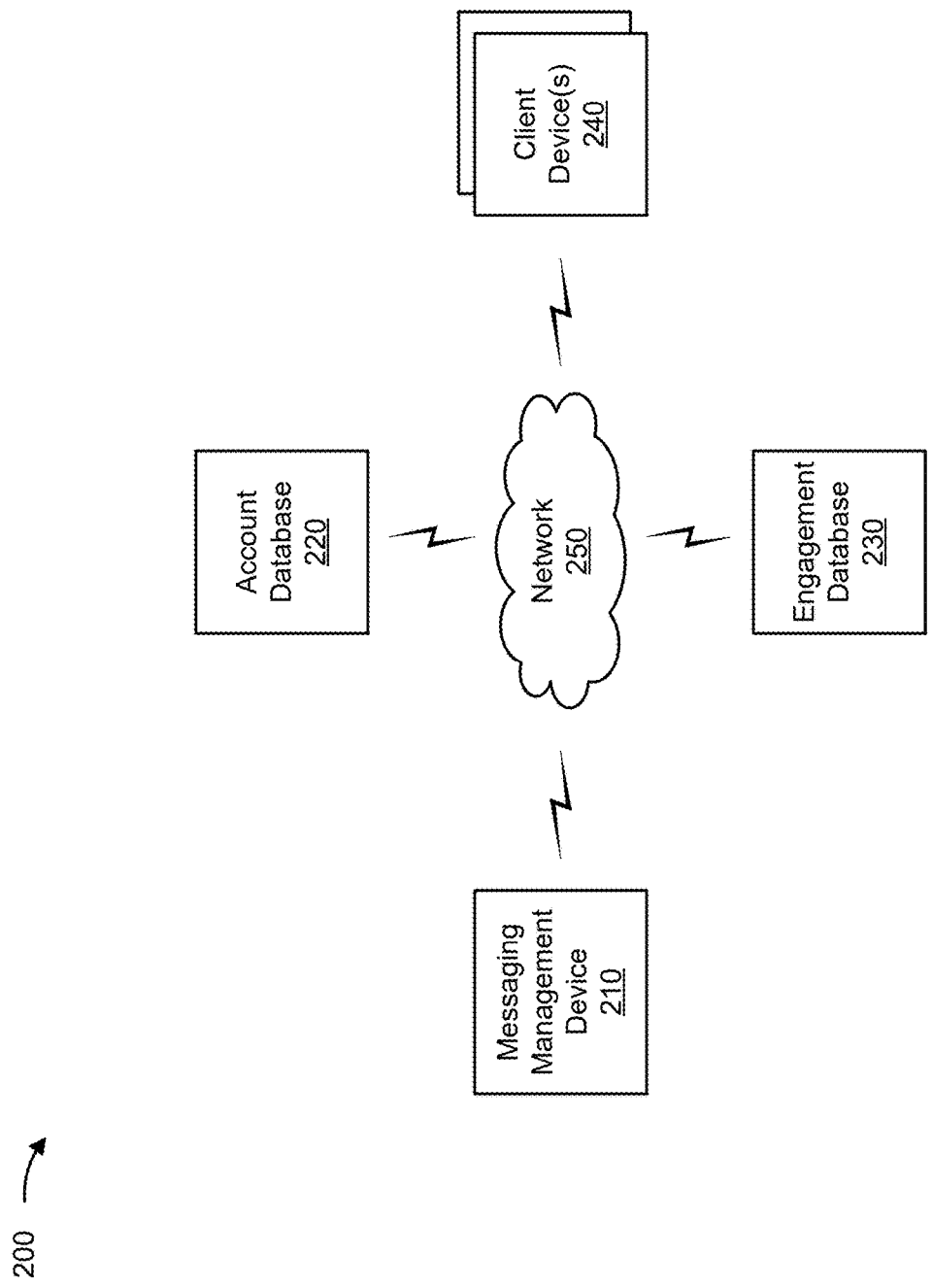
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a messaging management device 210, an account database 220, an engagement database 230, one or more client devices 240, and a network 250. Devices of environment 200 may interconnect via wired connections, wireless connections, or a combination of wired and wireless connections.

The messaging management device 210 may include one or more devices capable of receiving, generating, storing, processing, providing, and/or routing information associated with segmentation and engagement based messaging, as described elsewhere herein. The messaging management device 210 may include a communication device and/or a computing device. For example, the messaging management device 210 may include a server, such as an application server, a client server, a web server, a database server, a host server, a proxy server, a virtual server (e.g., executing on computing hardware), or a server in a cloud computing system. In some implementations, the messaging management device 210 may include computing hardware used in a cloud computing environment.

The account database 220 may include one or more devices capable of receiving, generating, storing, processing, and/or providing information associated with segmentation and engagement based messaging, as described elsewhere herein. The account database 220 may include a communication device and/or a computing device. For example, the account database 220 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the account database 220 may store account data, as described elsewhere herein (e.g., as described in connection with reference number 110 and elsewhere herein).

The engagement database 230 may include one or more devices capable of receiving, generating, storing, processing, and/or providing information associated with segmentation and engagement based messaging, as described elsewhere herein. The engagement database 230 may include a communication device and/or a computing device. For example, the engagement database 230 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the engagement database 230 may store historical engagement information for one or more accounts, as described elsewhere herein (e.g., as described in connection with reference number 120 and elsewhere herein).

The client device 240 may include one or more devices capable of receiving, generating, storing, processing, and/or providing information associated with segmentation and engagement based messaging, as described elsewhere herein. The client device 240 may include a communication device and/or a computing device. For example, the client device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 250 may include one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
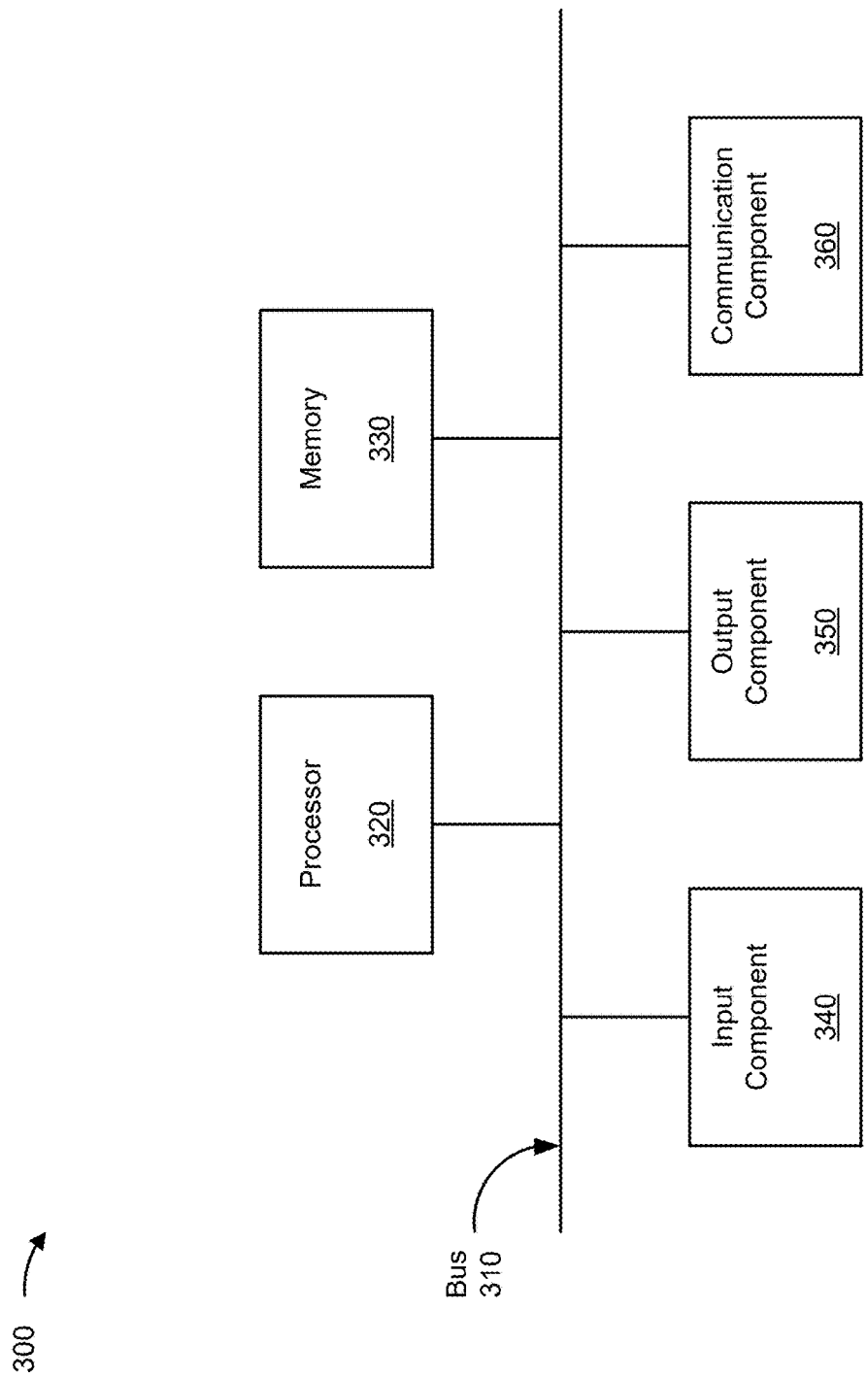
FIG. 3 is a diagram of example components of a device associated with segmentation and engagement based messaging, in accordance with some embodiments of the present disclosure.

FIG. 3 is a diagram of example components of a device 300 associated with segmentation and engagement based messaging. The device 300 may correspond to the messaging management device 210, the account database 220, the engagement database 230, and/or a client device 240. In some implementations, the messaging management device 210, the account database 220, the engagement database 230, and/or the client device 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
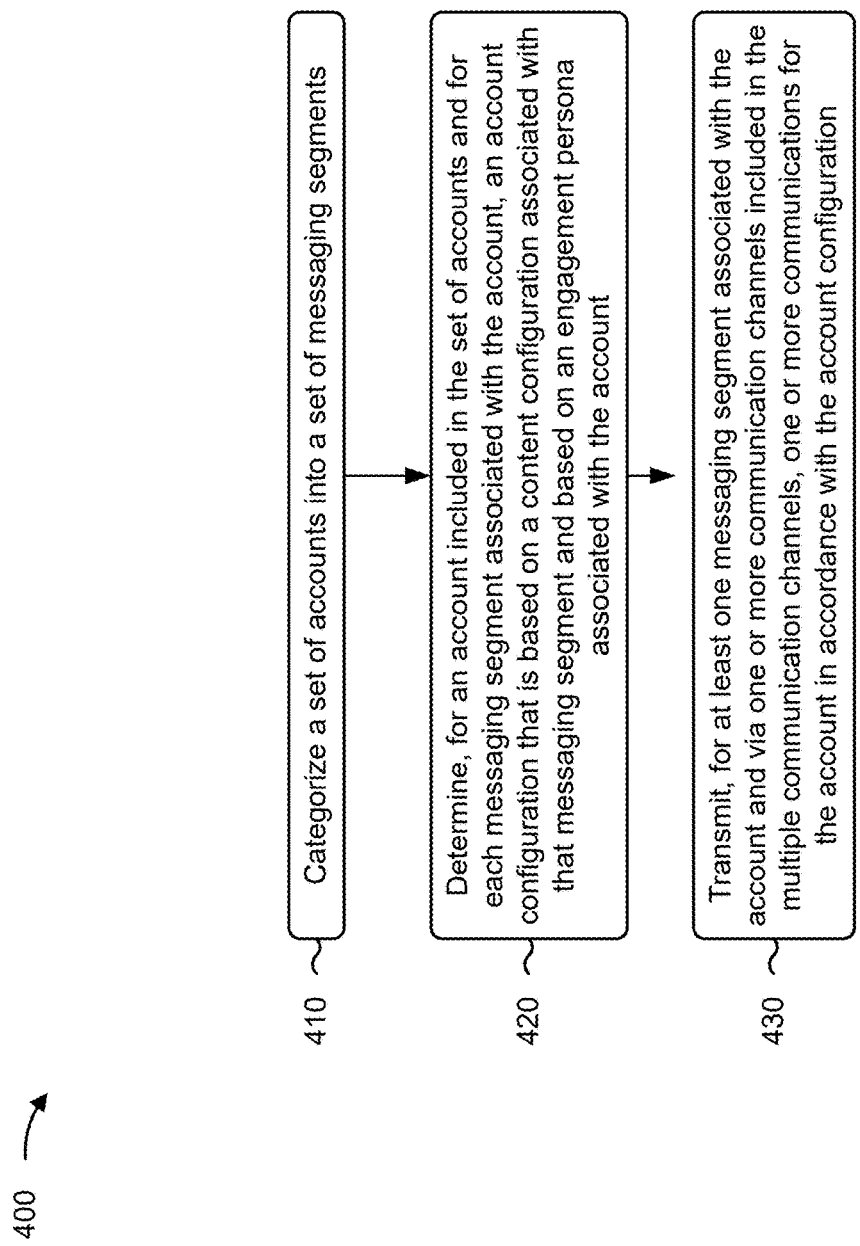
FIG. 4 is a flowchart of an example process associated with segmentation and engagement based messaging, in accordance with some embodiments of the present disclosure.

FIG. 4 is a flowchart of an example process 400 associated with segmentation and engagement based messaging. In some implementations, one or more process blocks of FIG. 4 may be performed by the messaging management device 210. In some implementations, one or more process blocks of FIG. 4 may be performed by another device or a group of devices separate from or including the messaging management device 210, such as the account database 220, the engagement database 230, and/or one or more client devices 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include categorizing a set of accounts into a set of messaging segments (block 410). For example, the messaging management device 210

(e.g., using processor 320 and/or memory 330) may categorize a set of accounts into a set of messaging segments, as described above in connection with reference number 115 of FIG. 1A. In some implementations, each account, of the set of accounts, is associated with one or more messaging segments of the set of messaging segments. In some implementations, the set of messaging segments are applicable to multiple communication channels. As an example, the messaging management device 210 may segment the set of accounts into the set of messaging segments. A messaging segment may define communication-channel-agnostic configuration information (e.g., content configuration information) for a subset or group of accounts.

As further shown in FIG. 4, process 400 may include determining, for each messaging segment associated with the account, an account configuration that is based on a content configuration associated with that messaging segment and based on an engagement persona associated with the account (block 420). For example, the messaging management device 210 (e.g., using processor 320 and/or memory 330) may determine, for each messaging segment associated with the account, an account configuration that is based on a content configuration associated with that messaging segment and based on an engagement persona associated with the account, as described above in connection with reference number 125 of FIG. 1B. As an example, the messaging management device 210 may modify a content configuration for a messaging segment based on the engagement persona of the account. As an example, the messaging management device 210 may modify the content configuration to cause communications to be transmitted more frequently or with different content for communication channel(s) with a higher likelihood of engagement for the account (e.g., as indicated by the engagement persona).

As further shown in FIG. 4, process 400 may include transmitting, via one or more communication channels included in the multiple communication channels, one or more communications for the account in accordance with the account configuration (block 430). For example, the messaging management device 210 (e.g., using processor 320, memory 330, and/or communication component 360) may transmit, via one or more communication channels included in the multiple communication channels, one or more communications for the account in accordance with the account configuration, as described above in connection with reference number 130 of FIG. 1C. As an example, for each messaging segment associated with the account, the messaging management device may transmit one or more communications in accordance with account configurations for respective messaging segments of the messaging segment(s) associated with the account.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
one or more memories; and
one or more processors, communicatively coupled to the one or more memories, configured to:
segment a set of accounts into a set of messaging segments,
wherein the set of messaging segments are associated with respective content configurations, wherein each account, of the set of accounts, is associated with one or more messaging segments of the set of messaging segments, and wherein the set of messaging segments are applicable to multiple communication channels;
determine relative engagement performance levels, for respective communication channels of the multiple communication channels, based on historical engagement information associated with one or more accounts, including the account, that are associated with the one or more messaging segments,
wherein the relative engagement performance levels indicate engagement levels of the account for the respective communication channels relative to engagement levels of respective accounts of the one or more accounts;
determine, for the account categories for the respective communication channels based on the relative engagement performance levels;
modify, for at least one communication channel included in the multiple communication channels, a content configuration for a particular messaging segment, of the set of message segments, for the at least one communication channel to obtain an account configuration that is based on:
the modified content configuration,
a category, of the categories, associated with the account, and
an engagement persona, associated with the account, indicating the relative engagement performance levels for the respective communication channels of the multiple communication channels; and
transmit, for each messaging segment associated with the account and via one or more communication channels included in the multiple communication channels, one or more communications for the account in accordance with the account configuration.

2. The system of claim 1, wherein the one or more processors, to modify the content configuration, are configured to:
modify a parameter, for the at least one communication channel, indicated by the content configuration based on an engagement level indicated by the category, wherein the parameter includes at least one of:
a communication frequency,
a communication intensity, or
a communication channel availability.

3. The system of claim 1, wherein the one or more processors, to modify the content configuration, are configured to:
modify a communication content, for the at least one communication channel, indicated by the content configuration based on an engagement level indicated by the category.

4. The system of claim 1, wherein the relative engagement performance levels for the respective communication channels indicate likelihoods of success for communications transmitted via the respective communication channels for the account.

5. The system of claim 1, wherein the one or more processors, to segment the set of accounts, are configured to:
obtain historical account data associated with respective accounts of the set of accounts;
determine, for each account and based on the one or more content configurations, the one or more messaging segments to be associated with that account; and
determine, for each account and based on the historical account data, one or more content configurations to be associated with that account.

6. The system of claim 1, wherein the one or more processors are further configured to:
obtain, based on transmitting the one or more communications, engagement information associated with the one or more communications; and
modify, based on the engagement information, the account configuration.

7. The system of claim 1, wherein the one or more processors are further configured to:
obtain, based on transmitting the one or more communications, feedback information indicating that the one or more communications were not successful via a first communication channel,
wherein the one or more communications indicate content;
determine, based on the account configuration, a second communication channel; and
transmit, via the second communication channel, another one or more communications indicating the content.

8. A method, comprising:
categorizing, by a device, a set of accounts into a set of messaging segments,
wherein each account, of the set of accounts, is associated with one or more messaging segments of the set of messaging segments, and
wherein the set of messaging segments are applicable to multiple communication channels;
determining relative engagement performance levels, for respective communication channels of the multiple communication channels, based on historical engagement information associated with one or more accounts, including the account, that are associated with the one or more messaging segments,
wherein the relative engagement performance levels indicate engagement levels of the account for the respective communication channels relative to engagement levels of respective accounts of the one or more accounts;
determining, by the device for the account, a prioritized ranking of the respective communication channels based on the relative engagement performance levels;
modifying, for at least one communication channel included in the multiple communication channels, a content configuration for a particular messaging segment, of the set of message segments, for the at least one communication channel to obtain an account configuration that is in accordance with the prioritized ranking and that is based on the modified content configuration and an engagement persona associated with the account; and
transmitting, by the device for at least one messaging segment associated with the account and via one or more communication channels included in the multiple communication channels, one or more communications for the account in accordance with the account configuration.

9. The method of claim 8, wherein the engagement persona indicates relative engagement performance levels for respective communication channels of the multiple communication channels,
wherein the relative engagement performance levels are relative to other accounts, of the set of accounts, included in an account category associated with the account.

10. The method of claim 8, wherein the account configuration indicates, for each messaging segment associated with the account, a prioritization of one or more communication channels.

11. The method of claim 8, further comprising:
obtaining, based on transmitting the one or more communications, engagement information indicating one or more user actions taken in response to the one or more communications;
determining, based on the engagement information, follow-up content;
determining, based on the account configuration, one or more communication channels over which to transmit the follow-up content; and
transmitting, via the one or more communication channels, another one or more communications indicating the follow-up content.

12. The method of claim 8, further comprising:
obtaining an update to one or more content configurations associated with the set of messaging segments; and
applying, for each communication channel associated with the set of messaging segments, the update to the one or more content configurations.

13. The method of claim 8, further comprising:
obtaining an indication of a live event associated with the account; and
modifying the account configuration in response to the live event.

14. The method of claim 8, wherein categorizing the set of accounts comprises:
obtaining historical account data associated with respective accounts of the set of accounts;
determining, for each account and based on the one or more content configurations, the one or more messaging segments to be associated with that account; and
determining, for each account and based on the historical account data, one or more content configurations to be associated with that account.

15. A non-transitory computer-readable medium storing a set of instructions, the set of instructions comprising:
one or more instructions that, when executed by one or more processors of a device, cause the device to:
segment a set of accounts into a set of messaging segments,
wherein the set of messaging segments are associated with respective content configurations,
wherein each account, of the set of accounts, is associated with one or more messaging segments of the set of messaging segments, and
wherein the set of messaging segments are applicable to multiple communication channels;
determine relative engagement performance levels, for respective communication channels of the multiple communication channels, based on historical engagement information associated with one or more accounts, including the account, that are associated with the one or more messaging segments,
wherein the relative engagement performance levels indicate engagement levels of the account for the respective communication channels relative to engagement levels of respective accounts of the one or more accounts;
determine, for the account, categories for the respective communication channels based on the relative engagement performance levels;
modify, for at least one communication channel included in the multiple communication channels, a content configuration for a particular messaging segment for the at least one communication channel to obtain an account configuration based on a category, of the categories, associated with the account for the at least one communication channel,
wherein the engagement persona indicates relative engagement performance levels for respective communication channels of the multiple communication channels; and
transmit, for each messaging segment associated with the account and via one or more communication channels included in the multiple communication channels, one or more communications for the account in accordance with the account configuration.

16. The non-transitory computer-readable medium of claim 15, wherein the one or more instructions, that cause the device to modify the content configuration, cause the device to:
modify a communication frequency, for the at least one communication channel, indicated by the content configuration based on an engagement level indicated by the category.

17. The non-transitory computer-readable medium of claim 15, wherein the one or more instructions further cause the device to:
obtain, based on transmitting the one or more communications, engagement information associated with the one or more communications; and
modify, based on the engagement information, the account configuration.

18. The non-transitory computer-readable medium of claim 15, wherein the one or more instructions further cause the device to:
- obtain an indication of a live event associated with the account; and
- modify the account configuration in response to the live event.

19. The non-transitory computer-readable medium of claim 15, wherein the one or more instructions further cause the device to:
- obtain an update to one or more content configurations associated with the set of messaging segments; and
- apply, for each communication channel associated with the set of messaging segments, the update to the one or more content configurations.

20. The non-transitory computer-readable medium of claim 15, wherein the one or more instructions further cause the device to:
- obtain, based on transmitting the one or more communications, feedback information indicating that the one or more communications were not successful via a first communication channel,
    - wherein the one or more communications indicate content;
- determine, based on the account configuration, a second communication channel; and
- transmit, via the second communication channel, another one or more communications indicating the content.

* * * * *